Aug. 26, 1958   L. H. RIKKEN   2,849,223
ADJUSTMENT DEVICE FOR WEIGHING SCALES
Filed Nov. 9, 1955   6 Sheets-Sheet 1
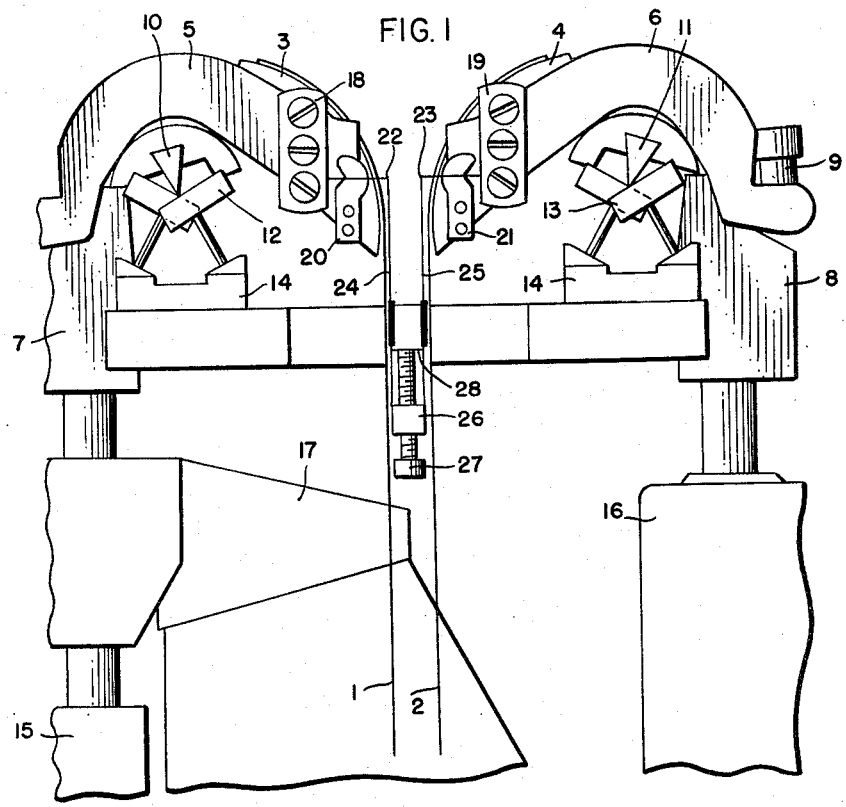
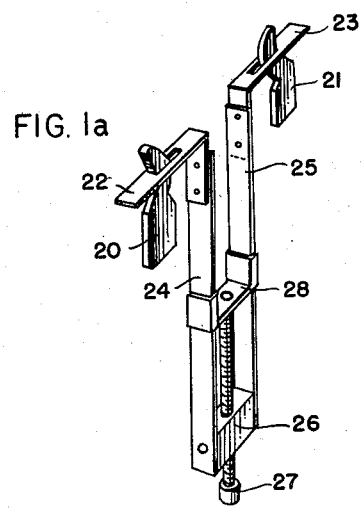
INVENTOR:
LEONARDUS H. RIKKEN
BY
*Margall, Johnston, Cook & Root*
ATT'YS

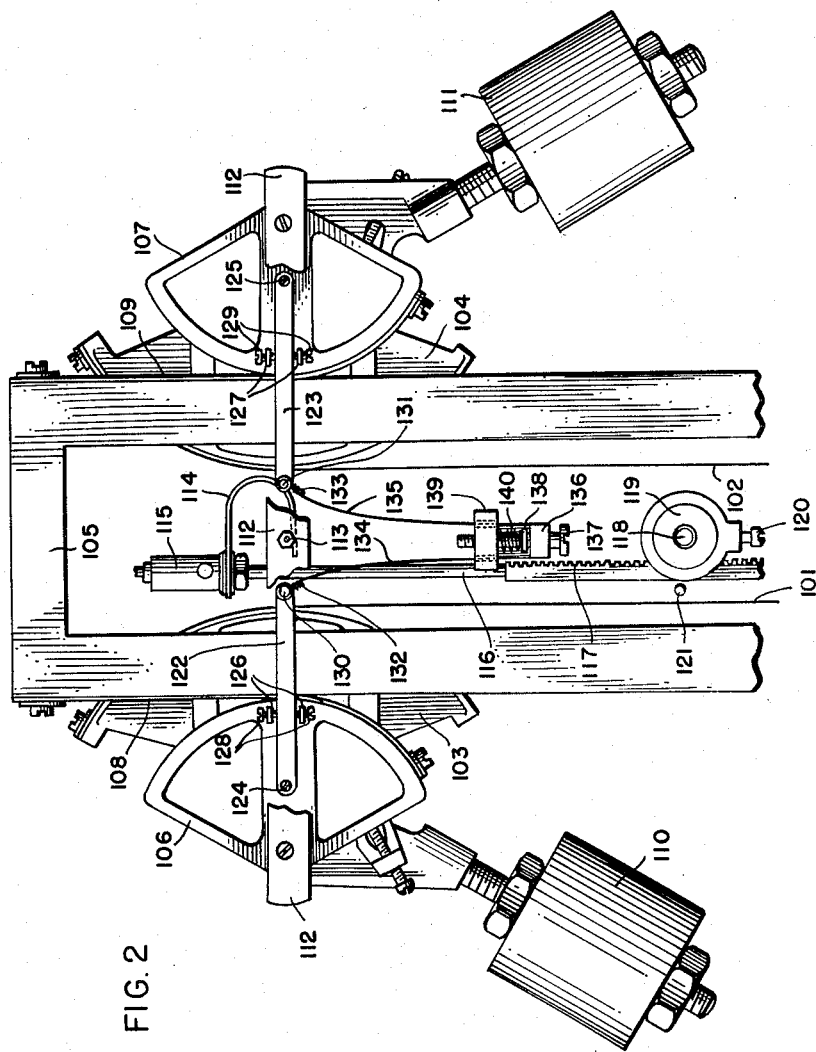

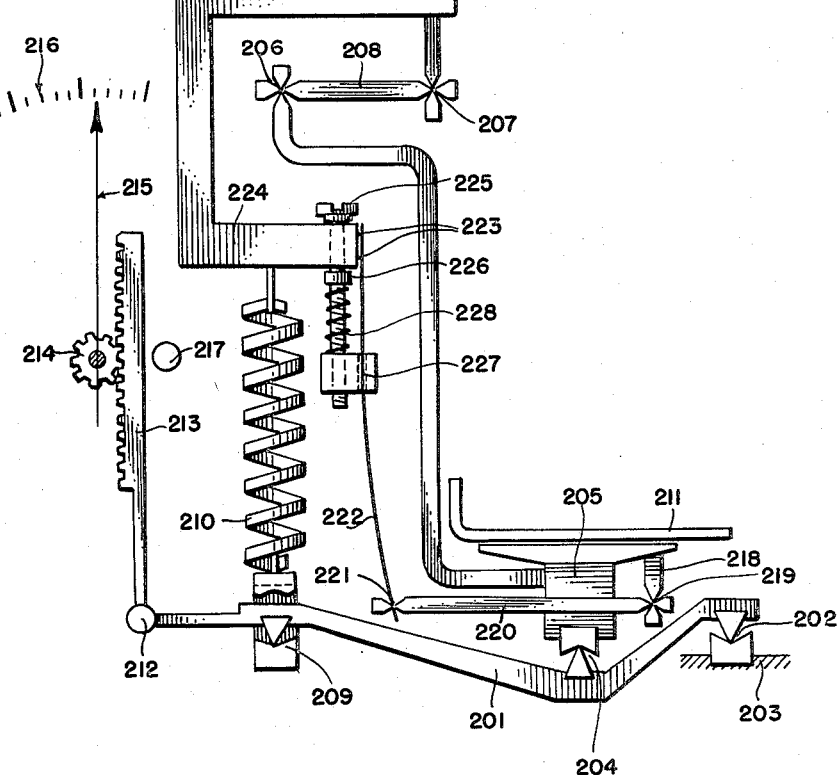

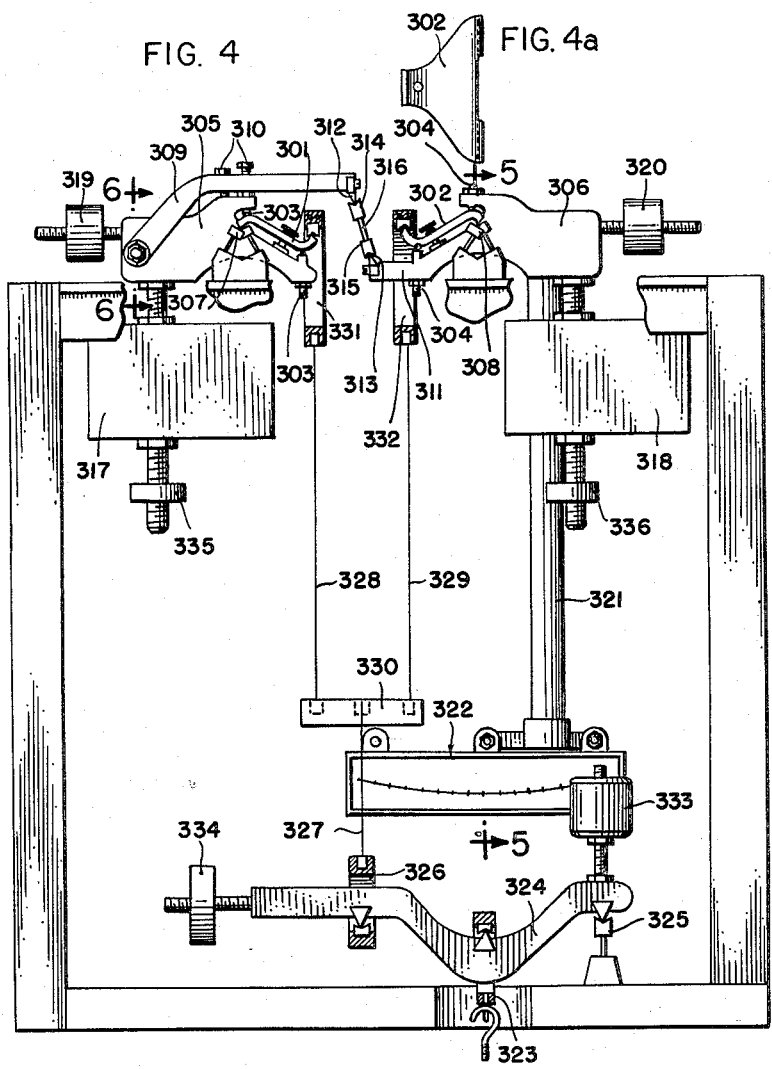

Aug. 26, 1958   L. H. RIKKEN   2,849,223
ADJUSTMENT DEVICE FOR WEIGHING SCALES
Filed Nov. 9, 1955   6 Sheets-Sheet 5
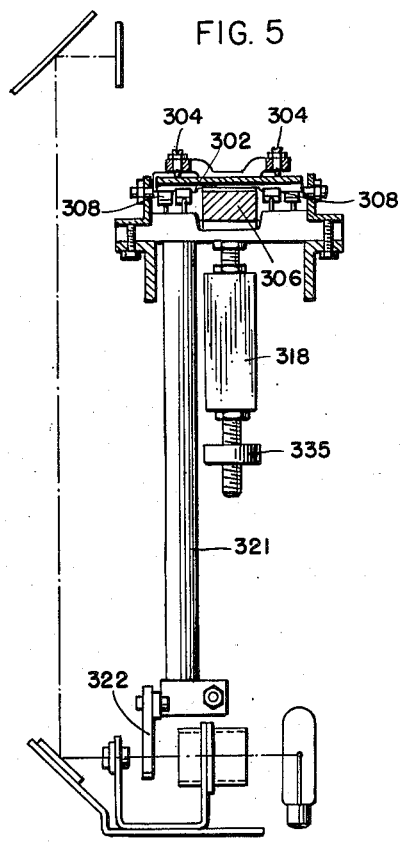
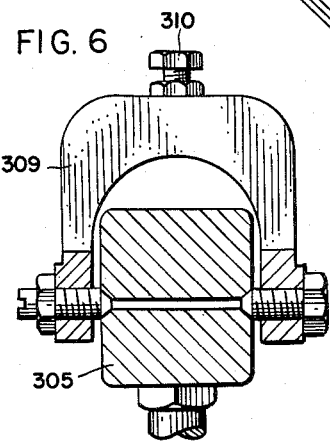
INVENTOR:
LEONARDUS H. RIKKEN
BY
ATT'YS Aug. 26, 1958  L. H. RIKKEN  2,849,223
ADJUSTMENT DEVICE FOR WEIGHING SCALES
Filed Nov. 9, 1955  6 Sheets-Sheet 6

INVENTOR:
LEONARDUS H. RIKKEN
BY
Margall, Johnston, Cook & Root.
ATT'YS

2,849,223

ADJUSTMENT DEVICE FOR WEIGHING SCALES

Leonardus H. Rikken, Rotterdam, Netherlands, assignor to U. S. Slicing Machine Company, Inc., La Porte, Ind., a corporation of Indiana Application November 9, 1955, Serial No. 545,900

Claims priority, application Great Britain November 25, 1954

11 Claims. (Cl. 265—27)

This invention relates to an adjustment device for a weighing scale having two associated parts at least one of which is adapted for turning movement about an axis, there being connecting means between said two parts.

A scale of that nature is described in British patent specification No. 654,104, wherein there is disclosed a tension spring interconnecting two separate pendulums of a twin pendulum system. The provision for changing the number of active coils on the springs allows adjustment of its capacity. The spring acts through thin flexible metal ribbons overlying sectors concentric with the pivoting axes of the separate pendulums of the twin pendulum system. The power arm of the moment exerted on both separate pendulums by the tension of the spring always remains constant, so that only a change of the stress of the spring effects a chance of the moment. This arrangement results in a change of only the initial pull (dead load) of the pendulous system.

Adjustment devices for eliminating errors proportional to the second power of the angular rotation are known, and a non-variable measure of third power adjustment is possible by way of eccentrically located power sectors.

Practical use has shown that after adjustment with said known adjustment means, there remains an error curve, changing its sign at zero load, half capacity load and full capacity load; and having its maxima, opposed in sign, at quarter and three-quarter capacity load.

An object of the present invention is to provide an adjustment device for reducing or eliminating errors at quarter loads, and at the same time, simple adjustment of errors at half load, which adjustment device may be used in weighing apparatus of different kinds, but in which the indication is related directly to the angular movement of one of said associated parts, as is the case with optical scales.

According to the invention, an adjustment device is provided for weighing scales having two associated parts, at least one of which is adapted for turning movement about an axis, comprising means connecting said two parts, and subjected to changes in configuration caused by this movement, the relationship between said changes and the force exerted on the connected parts being adjustable, in which the attachment of the connecting means to a movable part is such that during turning movement from the half-load position of the scale, the moment of at least a component of the force exerted by said connecting means on the movable part varies in direct proportion to the third power of the angular measure of the turning movement.

This arrangement can be obtained by locating the attachment points of the connecting means on one or both of the movable parts in such a way that the moment of the force, or a component of the force, which the connecting means exert on the moving part changes from zero, during turning movement from the half-load position, in direct proportion to the third power of the angular movement.

To make this further clear the following explanation is given.

When both separate pendulums of a twin pendulum system are interconnected by means on which the stress varies in proportion to change in shape, for instance, change in the length of a tension spring, it will be clear that in turning the pendulums of the system from a position in which the points of attachment are level with the pivotal axes of the pendulums, the distance between both of said points will increase. If the pendulums are turned through an angle $x$, the resulting increment of the distance between said points will be $2l(1-\cos x)$, where $l$ indicates the distance between a pivotal axis and its nearest attachment point. So, the tension of the spring increases according to $2lk(1-\cos x)$ ($k$ is a constant, depending on the capacity of the spring).

The power arm of the moment which the tension of the spring exerts on both pendulums is nil in the starting position but increases during turning according to $l \sin x$.

The total increment of the moment thus amounts to $2l^2k(1-\cos x) \sin x$ which, after development according to the progression of MacLaurin, becomes:

$$2l^2k\left(1-1+\frac{x^2}{2!}-\frac{x^4}{4!}\right)\left(x-\frac{x^3}{3!}+\frac{x^5}{5!}\cdots\right)=2l^2k\left(\frac{x^3}{2}-\frac{x^5}{8}\right)$$

with omission of powers higher than the fifth.

Now, the magnitude of the third power term $l^2kx^3$ may be varied as $k$ is directly dependent on the capacity of the spring.

The same theory is applicable when the attachment points of the spring are chosen so that the power arm of the moment is a maximum in the initial position, i. e., when each point is located on a line substantially perpendicular to the axis of the pendulum and to the line joining the pendulum axes. In this case the tension of the spring alters according to $k \sin x$, when the pendulous system is turned, whereas the power arm of the moment decreases according to $\cos x$, so that here also a third power term of $x$ is introduced in the equation of equilibrium.

The accompanying drawings drawings illustrate certain selected embodiments of the invention, and the views therein are as follows:

Fig. 1 is a fragmentary front elevation, somewhat diagrammatic, of a fixed centre twin pendulum having an adjustment device according to the invention;

Fig. 1a is a detail perspective view of the adjustment device of Fig. 1;

Fig. 2 is a detail elevational view, partly in section, showing a modified form of an adjustment device and incorporating a floating twin pendulum system of a weighing machine;

Fig. 3 is a detail elevational view, somewhat diagrammatic, showing another modified form of adjustment device incorporated in a spring balance;

Fig. 4 is a detail elevational view of another modified form of adjustment device which is incorporated in a fixed centre two pendulum system of a weighing machine;

Fig. 4a is a plan view of an S-shaped plate which is shown in elevation in Fig. 4;

Fig. 5 is a detail sectional view on the line 5—5 of Fig. 4;

Fig. 6 is a detail sectional view on the line 6—6 of Fig. 4;

Figure 7:
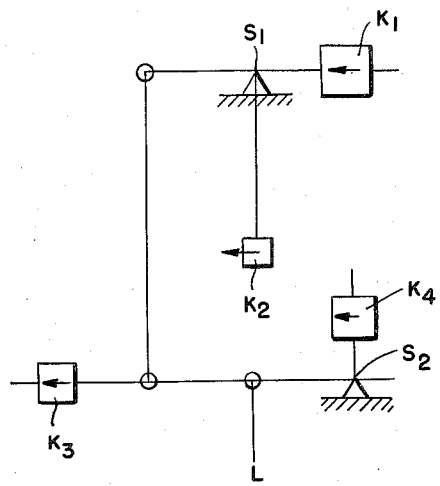
Fig. 7 is a force diagram of the device for out-of-level compensation in the pendulum shown in Fig. 4.

The particular construction herein shown for the purpose of illustrating the invention comprises flexible metallic ribbons 1 and 2 which carry the load, Fig. 1. These ribbons overlie, and are attached to, parts 3 and 4 of arcuate power sectors 5 and 6, the members 5 and 6 being adjustably attached to pendulum bodies 7 and 8. The sectors 5 and 6 each include arms which may be varied in position with regard to the pendulum bodies by distance pieces 9 (only one being shown) of a different height.

Knife-edge members 10 and 11 are attached to the pendulum bodies 7 and 8, and rest in V-troughs 12 and 13. The troughs 12 and 13 are formed by the top faces of pivot blocks which are resiliently supported on frames 14, as described in applicant's copending application, Serial No. 545,899, filed November 9, 1955. Poises 15 and 16 are adjustably mounted on threaded rods which are screwed into threaded bores of the pendulum bodies 7 and 8. A chart 17, in the form of a graticule, is furthermore attached to pendulum body 7, the indication on said chart being optically projected in a well-known manner (not shown).

Support plates 18 and 19, Fig. 1, are attached to the arcuate power sectors 5 and 6, in a manner which permits them to be slightly adjusted in both a horizontal and a vertical sense. These support plates 18 and 19 each carry an extension piece to which plates 20 and 21 are attached, Figs. 1 and 1a. The plates 20 and 21 have the shape of hooks and act as knife-edge pivots for angle pieces 22 and 23.

The angle pieces 22 and 23, Fig. 1a, are apertured in their horizontal portions to receive the plates 20 and 21. The sides of the pieces about the apertures come into contact with the plates 20 and 21, and are shaped to act as knife-edges.

The upper ends of leaf springs 24 and 25, Fig. 1a, are riveted onto the vertical portions of the angle pieces 22 and 23, while the lower ends of said springs are rigidly interconnected by a block 26 which is provided with a tapped bore to receive an adjusting screw 27. The leaf springs 24 and 25 are engaged by a clamping piece 28 to which the end of the screw 27 is pivotally attached so that if this screw is turned, the clamping piece 28 will move along the leaf springs 24 and 25. Thus, the active length, and also the capacity, of said leaf springs can be varied.

In the embodiment shown in Fig. 2, the load is applied through flexible metallic ribbons 101 and 102 which overlie, and are attached to, arcuate power sectors 103 and 104. Upright members of a frame 105 are located in front of, and behind, the sectors 103 and 104. These uprights of the frame 105 are fitted with guide tracks for twin sectors 106 and 107. These twin sectors 106 and 107 each form one rigid casting with the power sectors 103 and 104 respectively, but are not concentric with the power sectors 103 and 104. The sectors 106 and 107 are suspended from the top by flexible metal ribbons 108 and 109 operating in guide tracks.

Poises 110 and 111 are adjustably attached to the pendulum bodies formed on the sectors 106 and 107, and bridges 112 carry pivotal connections to the axes of turning of the twin sectors 106 and 107.

A rack 117, Fig. 2, is connected to the centres of the bridges 112 through the rack support 116, bushing 115, spring 114 and a cross-shaft 113. The rack 117 meshes with a pinion on a pointer shaft 118. The pointer shaft 118 is supported at the front and at the back by ball bearings 119 and secured by screws 120, while a roller 121 fixed to the frame 105, prevents the rack 117 from disengaging with the pinion.

At the front, the bridge 112 is positioned so that room is left for the movement of arms 122 and 123, the arms 122 and 123 being attached to the front faces of the twin sectors 106 and 107 by screws 124 and 125 respectively. Moreover, the arms 122 and 123 extend between projections 126 and 127 on both of the sectors 103 and 104. Set screws 128 and 129 clamp the arms 122 and 123 and provide for adjustment in a vertical plane. The juxtaposed ends of the arms 122 and 123 are provided with ball bearings 130 and 131.

The upper ends of two leaf spring 134 and 135, Fig. 2, are riveted onto projections 132 and 133 on the outer housings of said ball bearings 130 and 131, the lower ends of the leaf springs 134 and 135 being rigidly connected by a block 136 which has a central bore to receive an adjustment screw 137. The part of the screw 137 enclosed by the block 136 is not threaded, and a collar 138 secures the screw 137 against longitudinal displacement. The end of the screw engages into the tapped bore of a clamping piece 139 which embraces the leaf springs 134 and 135. A compression spring 140, located around the stem of the screw 137, prevents unwanted turning. Turning of the screw 137 slides the clamping piece 139 in a longitudinal direction over both leaf springs 134 and 135, thus changing their active length and also their capacity. An indication error at half load may be adjusted by the set screws 128 and 129 which define the positions of the arms 122 and 123, Fig. 2.

The modification shown in Fig. 3 comprises a lever 201, of the second order, which is supported on a base 203 by a knife-edge pivot member 202. A receiver support 205 is pivotally mounted on the lever 201 by knife bearing 204. Knife bearings 206 and 207, and link 208 provide a parallel guide for the receiver support 205. The lever 201 is connected to a load counterbalancing spring 210 through a stirrup 209. Deflection of the lever 201, caused by a load placed on a receiver 211, is indicated on a chart 216 through a bearing 212, a rack 213, a pinion 214 and a pointer dial 215. A roller 217 prevents the rack from disengaging with the pinion.

A bracket 218, Fig. 3, depends from the receiver support, and a link 220 is connected at one end to said bracket 218 by knife bearing 219, and at its other end to a leaf spring 222 by a knife bearing member 221. The upper end of the leaf spring 222 is riveted at points 223 to frame 224 of the scale.

The frame 224, Fig. 3, is provided with a bore to receive an adjusting screw 225. The part of the screw which is enclosed by the frame 224 has not been threaded, and a collar 226 secures the screw 225 against longitudinal displacement. The threaded end of the screw 225 engages the tapped bore of clamping piece 227 which embraces the leaf spring 222. A compression spring 228 secures the screw 225 against unwanted turning. Turning of the screw 225 slides the clamping piece 227 over the spring 222, thus modifying the spring's active length and also its capacity.

When the spring balance is in half-load position, the link 220 lies horizontally. A change in load causes a movement to the right of the bearing 221 and thus causes shortening of the horizontal projection of the link 220. Because of this, the pull of the leaf spring 222 increases in proportion to the movement of bearing 221. At the same time, the power arm of the movement exerted by the leaf spring onto the lever 201 increases.

A mathematical development like that previously given will show that here also a third power term is introduced in the equation of equilibrium.

The modified arrangement shown in Figs. 4 to 6 inclusive comprises two S-shaped plates 301 and 302, Figs. 4 and 4a, which rest on set screws 303, 303 and 304, 304. These pairs of set screws extend through tapped bores in pendulum bodies 305 and 306 of a two pendulum system.

An arm 309, Fig. 6, is attached to the pendulum body 305 and set screws 310 allow adjustment of the body 305 in a plane perpendicular to the pivoting axis of the pendulum system. An arm 311, Fig. 4, forms part of the pendulum body 306. The ends of the arms 309 and 311 carry knife-edge members 312 and 313 respectively, a strut-like link being located between the edges 312 and 313. The link is formed by two knife-edge bearing blocks 314 and 315 to which there is connected the ends of a piece of resilient wire 316.

Two screw threaded rods, one substantially horizontal, and the other substantially vertical in the half-load position of the pendulum, are attached to each pendulum body, Figs. 4 to 6. Counterweight poises 317, 318, 319 and 320 are adjustably mounted on these rods. The larger weights 317 and 318, Figs. 4 and 5, are asymmetrically positioned with regard to the main pivots. In this way, the pendulums 305 and 306 have unequal dead loads which can be adjusted by the smaller weights 319 and 320, Fig. 4.

A screw-threaded arm 321, Figs. 4 and 5, depending from the pendulum body 306, carries a graticule 322 from which a reading is optically projected.

The weight load is applied to lever 324, Fig. 4, through a stirrup 323. The lever 324 is pivoted in a resiliently supported knife bearing 325. Through the stirrup 326, steel wires 327, 328 and 329 and bridge 330, the load forces are imparted to stirrups 331 and 332 which rest on the upturned and sharp-edged sides of the S-shaped plates 301 and 302, Figs. 4 and 4a.

Two threaded rods are attached to the lever 324, Fig. 4, one rod being substantially vertical over the fulcrum of the lever, the other rod being substantially horizontal and in line with the lever 324. Weights 333 and 334 are adjustably mounted on the horizontal and the vertical screw-threaded rods, respectively. Underneath the main weights 317 and 318, and on the same rods as the latter, small supplementary weights 335 and 336 respectively, Figs. 4 and 5, are provided, each serving to effect small changes on the capacity of both separate pendulums.

In operation, as different dead loads are counter-balanced by the separate pendulums, the juxtaposed ends of the arms 309 and 311 tend to move towards each other. The link formed by the bearing blocks 314 and 315 and the resilient connection 316 thus receives a thrust from both sides, Fig. 4.

In the half-load position of the pendulous system this link is normally at mutual right angles to the lines joining the pivotal axis of a pendulum and the knife-edge which engages the link on that side. Thus, apart from the action and reaction of the pendulum on the link and vice versa, no turning forces act on the pendulum.

However, as soon as the pendulous system moves from its half-load position, the link, formed by the bearing blocks 314, 315 and connection 316, Fig. 4, will change its direction, thereby creating a moment which tends to increase the angular rotation from half-load still further. This moment increases in direct proportion to the third power of the angular rotation from the half-load position.

By differentiating the dead load of both separate pendulums, which may be done by adjusting the weights 317 and 318 sideways in the same direction, Figs. 4 and 5, the thrust on the link and, accordingly, the magnitude of the third power term, which it introduces in the equation of equilibrium, can be altered. Thus, it is possible to correct for errors at quarter load, as indicated hereinbefore.

By differentiating the capacities of the separate pendulums, this being effected by adjusting the weights 335 and 336 in different directions, Fig. 4, the thrust on the link arrangement 314, 315 and 316 will be augmented, during turning from the half-load position by the difference between the resisting moments of both pendulums, said difference increasing in direct proportion to the tangent of the rotation angle $x$.

Now as:

$$\text{Tan } x = x + \frac{1}{3}x^3 + \frac{2}{15}x^5 + \ldots$$

we have, substantially, a linear influence of $x$ on the stress in the link which, superimposed on the third power influence which the stress in said link already possesses, results in the appearance of a term of the fourth power of $x$ in the equation of equilibrium.

Thus, indication errors which proceed in proportion to the fourth power of the angular movement may be corrected.

The weights 333 and 334 on the lever 324, Fig. 4, are intended substantially to correct for out-of-level errors of the weighing system, the latter being caused by the fact that both separate pendulums have a different dead load and capacity. This difference, in fact, may be conceived as a single pendulum with a dead load equal to the difference in dead loads and a capacity equal to the difference in capacities between both separate pendulums of the two pendulum system. In Fig. 7 this is diagrammatically illustrated.

The single pendulum, Fig. 7, representing the differences in dead load and capacity is shown in the half-load position. Arrows $K_1$, $K_2$, $K_3$ and $K_4$ represent the lateral components of the gravitational force caused by the "out-of-level" position of the pendulum.

When the load L increases, the force $K_1$ will exert a counterclockwise moment with regard to the main pivot $S_1$ which, however, is compensated by a clockwise moment of $K_3$ with regard to the fulcrum $S_2$, the moment also increasing. The moments of $K_2$ with regard to $S_1$ and of $K_4$ with regard to $S_2$ are likewise opposed.

The poise 333 on which $K_4$ acts in Fig. 4, forms a negative pendulum. This negative pendulous action is compensated by an increase in the total capacity of the pendulous system.

The poise 334, Fig. 4, also acts as zero setting for the pendulum. The small change caused in the "out-of-level" compensation when this poise is slightly moved, may be overlooked.

An adjustment of the arm 309 with regard to the pendulum body 305, which may be done by means of the screws 310, Fig. 5, causes a change in indication at half-load, thus providing means for adjustment for eliminating half-load errors.

Figure 8:
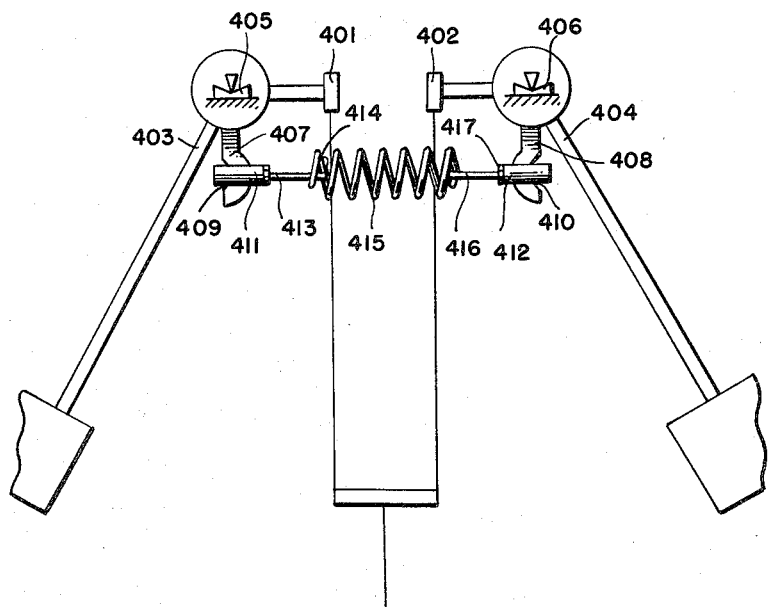
Fig. 8 is a detal diagrammatic or schematic view of another modified form of adjustment device incorporated in a fixed centre twin pendulum system of a weighing machine.

In the diagrammatic view showing in Fig. 8, a load is shown as being applied through stirrups 401 and 402 which rest on knife-edges forming part of separate pendulums 403 and 404, the latter being pivoted on a frame in knife bearings 405 and 406. Hooks 407 and 408 form part of the pendulum bodies and are provided with bearings 409 and 410 in which the knife-edges of stirrups 411 and 412 rest.

In the half-load position of the weighing mechanism, the bearings 409 and 410 lie substantially perpendicularly below the main pivots 405 and 406.

A rod 413 is rotatably attached at one end to the stirrup 411, and at its other end is attached to one end of a tension spring 415, by means of an eyelet 414. The eyelet 414 is slidably adjustable on the coils of the spring 415. In this way adjustment of the capacity of this spring is possible.

The other end of the spring ends in a hook, which engages a further hook on the end of a rod 416, said rod being adjustably attached to the stirrup 412 by means of nut 417. In adjusting the length of the rod 416, the initial pull of the spring 415 may be regulated.

Changes may be made in the form, construction and arrangement of the parts without departing from the spirit of the invention or sacrificing any of its advantages, and the right is hereby reserved to make all such changes as fall fairly within the scope of the following claims.

The invention is hereby claimed as follows:

1. An adjustment device for a weighing scale having two associated parts at least one of which is adapted for pivotal movement about an axis, comprising adjustable means connecting said two parts and subjected to change in configuration caused by pivotal movement of said one part, said means being capable of exerting a biasing force on said connected parts, the attachment of the connecting means to said one pivotal part being such that during pivotal movement from the half-load position of the scale, the moment of at least a component of the force exerted by said connecting means on the one said pivotal part varies in direct proportion to the third power of the angular measure of the pivotal movement.

2. An adjustment device according to claim 1 characterized in that the adjustment device is adapted for use with a twin pendulum system, said adjustment device comprising a pair of leaf springs attached at their ends one to each pendulum and fixedly interconnected at their other ends, and a clamping piece adapted to engage the springs intermediate their ends and adapted for adjustment along the length of the springs to control the free lengths thereof and so modify the relationship between variation of the stress exerted by the springs on the pendulums during turning movement of the pendulums.

3. An adjustment device according to claim 1 characterized in that the adjustment device is adapted for use with a spring balance in which a link is pivotally connected at one end to a moving part of the balance, such as a load receiver, said device comprising a leaf spring fixed at one end to the frame of the balance and connected at its other end to the other end of said link, and a clamping piece adapted to embrace said spring intermediate the ends thereof and for adjustment along the length of the spring to control the free length thereof.

4. An adjustment device according to claim 1 characterized in that the device is adapted for use with a two unequal pendulum system of which the pendulums turn in opposite senses under changing load, said system comprising a strut-like link, means provided on one pendulum to engage one end of the link, and means on the other pendulum to engage the other end of said link, said link permitting turning of said pendulums in opposite senses and preventing turning in the same sense, at least one of said means being adjustable relative to its pendulum to provide for correction of errors at half-load when and only when said link lies at mutual right angles to the direction of thrust of said means.

5. An adjustment device according to claim 1 characterized in that the device is adapted for use with a fixed centre twin pendulum system, comprising a coiled tension spring, and connecting means between said spring and said pendulums, said latter connecting means providing at half-load position maximum power arm for the turning moment of the spring on the pendulums, said latter connecting means also being adapted to allow adjustment of the capacity of the spring.

6. An adjustment device for a weighing scale having two associated parts each of which are adapted for pivotal movement about an axis, a pair of leaf springs one attached to each said part, means for connecting the other ends of said leaf springs together so that a resistive force is generated on pivotal movement of said parts wherein the resistive force varies relative to the angular movement of said parts.

7. An adjustment device for a weighing scale having two associated parts each of which are adapted for pivotal movement about an axis, a pair of leaf springs, one attached to each said part, means for connecting the other ends of said leaf springs together so that a resistive force is generated on pivotal movement of said parts wherein the resistive force varies relative to the angular movement of said parts, and means for changing the effective length of said leaf springs to vary the resistive force generated upon pivotal movement of said parts.

8. An adjustment device for a weighing scale having two associated parts each of which are adapted for pivotal movement about an axis, a leaf spring attached to each part, means for connecting the free ends of said springs together, and means for adjusting the effective length of said springs, whereby pivotal movement of said parts in opposite direction is resisted by the force of said springs directly relative to the angular movement of said parts.

9. An adjustment device for a weighing scale having two associated parts at least one of which is adapted for pivotal movement about an axis, comprising adjustable means connecting said two parts and subjected to change in configuration caused by pivotal movement of said one part, said means being capable of exerting a biasing force on said connected parts, and means for adjusting the relationship between said changes and said force, the attachment of the connecting means to said one pivotal part being such that during pivotal movement from the half-load position of the scale, the moment of at least a component of the force exerted by said connecting means on the one said pivotal part varies in direct proportion to the third power of the angular measure of the pivotal movement.

10. In a pendulum system, two juxtaposed pendulums, means for applying a force to each pendulum to rotate the pendulums in opposite directions, a fulcrum on each pendulum located outside the axis of rotation of the pendulum and so that the angles described by said fulcrums around said axis are directed towards each other, a link of varying length connecting said fulcrums, said link exerting a force on the fulcrums which is dependent on the length of the link, and means for adjusting the ratio between variations in the force exerted by said link and variations in said link.

11. In a pendulum counterbalance for a weighing scale, in combination, a pendulum having an axis of rotation; a power sector attached to said pendulum, means for applying load forces to said sector, and means connected to said power sector for applying a resistive force to the pivotal movement of said pendulum, said means including a leaf spring, wherein the moment of at least a component of the force exerted by said leaf spring varies in direct proportion to the third power of the angular measure of the pivotal movement of said pendulum.

References Cited in the file of this patent

UNITED STATES PATENTS

| | | |
|---|---|---|
| 837,557 | Gehre | Dec. 4, 1906 |
| 1,285,591 | Barrett | Nov. 26, 1918 |
| 1,327,450 | Sweet | Jan. 6, 1920 |
| 1,352,097 | Sonander | Sept. 7, 1920 |
| 1,564,387 | Wesley | Dec. 8, 1925 |
| 1,601,459 | Sykes | Sept. 28, 1926 |
| 1,788,006 | Timson | Oct. 7, 1930 |
| 1,872,420 | De Iongh | Aug. 16, 1932 |
| 2,607,580 | Romig | Aug. 19, 1952 |
| 2,613,073 | Singleton | Oct. 7, 1952 |
| 2,617,642 | Singleton | Nov. 11, 1952 |
| 2,633,350 | Williams | Mar. 31, 1953 |